(12) United States Patent
Kim et al.

(10) Patent No.: US 12,388,282 B2
(45) Date of Patent: Aug. 12, 2025

(54) BATTERY MANAGEMENT APPARATUS AND METHOD

(71) Applicant: LG ENERGY SOLUTION, LTD., Seoul (KR)

(72) Inventors: Ji-Yeon Kim, Daejeon (KR); Kyung-Hwa Woo, Daejeon (KR); Yoon-Jung Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/684,384

(22) PCT Filed: Jun. 2, 2023

(86) PCT No.: PCT/KR2023/007636
§ 371 (c)(1),
(2) Date: Feb. 16, 2024

(87) PCT Pub. No.: WO2023/249285
PCT Pub. Date: Dec. 28, 2023

(65) Prior Publication Data
US 2024/0266859 A1 Aug. 8, 2024

(30) Foreign Application Priority Data
Jun. 21, 2022 (KR) .......... 10-2022-0075815

(51) Int. Cl.
*H01M 10/42* (2006.01)
*H01M 10/44* (2006.01)
*H02J 7/00* (2006.01)

(52) U.S. Cl.
CPC ....... *H02J 7/00712* (2020.01); *H01M 10/425* (2013.01); *H02J 7/0047* (2013.01); *H01M 2010/4271* (2013.01)

(58) Field of Classification Search
None
See application file for complete search history.

(56) References Cited

U.S. PATENT DOCUMENTS

2004/0197659 A1  10/2004  Kumar et al.
2013/0314050 A1  11/2013  Matsubara et al.
(Continued)

FOREIGN PATENT DOCUMENTS

JP   2013-247003 A   12/2013
JP   2014-044929 A    3/2014
(Continued)

OTHER PUBLICATIONS

International SearchReport from PBT/KR2023/007636, dated Sep. 14, 2023.
(Continued)

*Primary Examiner* — Julian D Huffman
*Assistant Examiner* — Sadia Kousar
(74) *Attorney, Agent, or Firm* — BRYAN CAVE LEIGHTON PAISNER LLP

(57) ABSTRACT

A battery management apparatus according to an embodiment of the present disclosure includes a profile obtaining unit configured to obtain a gas amount profile indicating a correspondence relationship between a gas generation amount of a battery and a change amount of a peak; a profile generating unit configured to generate a differential profile for a battery profile indicating a correspondence relationship between a capacity of the battery and a differential voltage; and a control unit configured to determine a change amount of a target peak in the battery profile received from the profile generating unit and set a usage condition of the battery based on a result determined by comparing the determined change amount of the target peak with a control criterion of the gas amount profile.

8 Claims, 4 Drawing Sheets

(56) References Cited

U.S. PATENT DOCUMENTS

| | | | |
|---|---|---|---|
| 2013/0335009 A1* | 12/2013 | Katsumata | G01R 31/3842 |
| | | | 702/63 |
| 2015/0004506 A1 | 1/2015 | Tomita et al. | |
| 2021/0048481 A1 | 2/2021 | Park et al. | |
| 2021/0270907 A1* | 9/2021 | Shimonishi | H01M 10/4285 |
| 2021/0328254 A1 | 10/2021 | Choi et al. | |
| 2022/0276314 A1 | 9/2022 | Kim et al. | |
| 2023/0057912 A1* | 2/2023 | Yoon | H01M 50/105 |
| 2023/0273263 A1 | 8/2023 | Bae et al. | |
| 2023/0296687 A1 | 9/2023 | Sada et al. | |
| 2023/0318057 A1 | 10/2023 | Yoon et al. | |

FOREIGN PATENT DOCUMENTS

| | | |
|---|---|---|
| JP | 5812118 B2 | 11/2015 |
| JP | 2016-093066 A | 5/2016 |
| JP | 2018-147742 A | 9/2018 |
| KR | 10-2020-0142176 A | 12/2020 |
| KR | 10-2021-0031226 A | 3/2021 |
| KR | 10-2022-0031412 A | 3/2022 |
| KR | 10-2022-0043640 A | 4/2022 |
| WO | 2022/014280 A1 | 1/2022 |

OTHER PUBLICATIONS

Written Opinion of the ISA from PCT/KR2023/007636, dated Sep. 14, 2023.

* cited by examiner

BATTERY MANAGEMENT APPARATUS AND METHOD

CROSS-REFERENCE TO RELATED APPLICATION

This application is a National Phase entry pursuant to 35 U.S.C. 371 of International Application No. PCT/KR2023/007636 filed on Jun. 2, 2023, which claims priority to and the benefit of Korean Patent Application No. 10-2022-0075815 filed on Jun. 21, 2022, the disclosures of which are incorporated herein by reference in their entireties.

TECHNICAL FIELD

The present disclosure relates to a battery management apparatus and method, and more particularly, to a battery management apparatus and method capable of diagnosing a state of a battery in a non-destructive manner.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

These batteries can degrade as charging and discharging continues. For example, the generation of gas may reduce the electron transport capacity within the electrode, resulting in negative electrode degrade imbalance. Additionally, because the battery's gas generation amount can lead to ignition, there is a problem that an unexpected accident may occur if the battery condition diagnosis is not carried out quickly.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is designed to solve the problems of the related art, and therefore the present disclosure is directed to providing a battery management apparatus and method capable of diagnosing a state of a battery in a non-destructive manner by analyzing a gas amount profile.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

A battery management apparatus according to one aspect of the present disclosure may comprise: a profile obtaining unit configured to obtain a gas amount profile indicating a correspondence relationship between a gas generation amount of a battery and a change amount of a peak; a profile generating unit configured to generate a differential profile for a battery profile indicating a correspondence relationship between a capacity of the battery and a differential voltage; and a control unit configured to determine a change amount of a target peak in the battery profile received from the profile generating unit and set a usage condition of the battery based on a first result determined by comparing the change amount of the target peak with a control criterion of the gas amount profile.

In the battery management apparatus according to one aspect of the present disclosure, the control unit may be configured to determine the target peak in the differential profile and determine the change amount of the target peak based on a second result determined by comparing a capacity value of a preset criterion peak and a capacity value of the target peak.

In the battery management apparatus according to one aspect of the present disclosure, the control criterion may include a first control criterion configured to determine whether the change amount of the target peak is less than or equal to a first change amount corresponding to a criterion value of the gas generation amount preset in the gas amount profile; and a second control criterion configured to determine whether the change amount of the target peak is less than or equal to a second change amount corresponding to a criterion value based on a loss amount of a negative electrode reaction area.

In the battery management apparatus according to one aspect of the present disclosure, the control unit may be configured to adjust temperature and SOC of the battery and reduce C-rate when the change amount of the target peak satisfies the first control criterion.

In the battery management apparatus according to one aspect of the present disclosure, the control unit may be configured to reduce C-rate when the change amount of the target peak satisfies the second control criterion.

In the battery management apparatus according to one aspect of the present disclosure, the first change amount may be less than or equal to the second change amount.

In the battery management apparatus according to one aspect of the present disclosure, the gas amount profile may be generated based on a first differential profile for a plurality of batteries with different temperatures in an SOC and a gas generation amount of the plurality of batteries.

In the battery management apparatus according to one aspect of the present disclosure, the gas amount profile may comprises correlation information between a change amount of a peak determined in a second differential profile for the plurality of batteries and a second gas generation amount.

A battery pack according to another aspect of the present disclosure may comprise the battery management apparatus according to an aspect of the present disclosure.

A battery management method according to still another aspect of the present disclosure may comprise: a gas amount profile obtaining step of obtaining a gas amount profile indicating a correspondence relationship between a gas generation amount of a battery and a change amount of a peak; a differential profile generating step of generating a differential profile for a battery profile indicating a correspondence relationship between a capacity of the battery and a differential voltage; a target peak change amount determining step of determining a change amount of a target peak in the battery profile; and a usage condition setting step of setting a usage condition of the battery based on a first result determined by comparing the change amount of the target peak with a control criterion of the gas amount profile.

In the battery management method according to one aspect of the present disclosure, method may further comprise: determining the target peak in the differential profile; and determining the change amount of the target peak based on a second result determined by comparing a capacity value of a preset criterion peak and a capacity value of the target peak.

In the battery management method according to one aspect of the present disclosure, the control criterion may include: a first control criterion configured to determine whether the change amount of the target peak is less than or equal to a first change amount corresponding to a criterion value of the gas generation amount preset in the gas amount profile; and a second control criterion configured to determine whether the change amount of the target peak is less than or equal to a second change amount corresponding to a criterion value based on a loss amount of a negative electrode reaction area.

In the battery management method according to one aspect of the present disclosure, the method may further comprise: adjusting temperature and a state of charge (SOC) of the battery; and reducing C-rate when the change amount of the target peak satisfies the first control criterion.

In the battery management method according to one aspect of the present disclosure, the method may further comprise reducing C-rate when the change amount of the target peak satisfies the second control criterion.

In the battery management method according to one aspect of the present disclosure, the first change amount may be less than or equal to the second change amount.

In the battery management method according to one aspect of the present disclosure, the method may further comprise generating the gas amount profile based on a first differential profile for a plurality of batteries with different temperatures in an SOC and a first gas generation amount of the plurality of batteries.

In the battery management method according to one aspect of the present disclosure, the gas amount profile may comprise correlation information between a change amount of a peak determined in a second differential profile for the plurality of batteries and a second gas generation amount.

According to one aspect of the present disclosure, the state of the battery can be diagnosed in a non-destructive manner by interpreting the gas amount profile. In particular, it can be specifically diagnosed whether the battery's gas generation amount is equal to or more than a threshold value.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
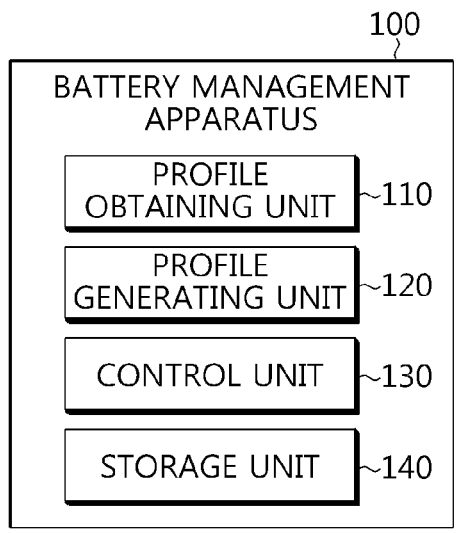
FIG. 1 is a diagram schematically showing a battery management apparatus according to an embodiment of the present disclosure.

FIG. 1 is a diagram schematically showing a battery management apparatus 100 according to an embodiment of the present disclosure.

Referring to FIG. 1, the battery management apparatus 100 according to an embodiment of the present disclosure may include a profile obtaining unit 110, a profile generating unit 120, and a control unit 130.

The profile obtaining unit 110 may be configured to obtain a gas amount profile indicating a correspondence relationship between the gas generation amount of the battery and the change amount of the peak.

Here, the battery means one physically separable independent cell including a negative electrode terminal and a positive electrode terminal. For example, one lithium-ion battery or lithium polymer battery may be regarded as a battery. Additionally, the battery may mean a battery module in which a plurality of cells are connected in series and/or parallel. Hereinafter, for convenience of explanation, the battery is explained as meaning one independent cell.

For example, the profile obtaining unit 110 may directly receive the gas amount profile from the outside.

The gas amount profile may mean a profile that is generated based on the differential profile for a plurality of batteries with different temperatures in a specific SOC and the gas generation amount of the plurality of batteries.

For example, the gas amount profile may indicate the correspondence relationship between the gas generation amount of the battery and the change amount of the peak. Here, the gas generation amount and the peak change amount may be relative values. For example, the gas generation amount and the peak change amount may be normalized values.

Additionally, the gas amount profile can be expressed as an X-Y two-dimensional graph when X is set to the change amount of the peak and Y is set to the total gas amount. It will be described in detail with reference to FIG. 2.

Figure 2:
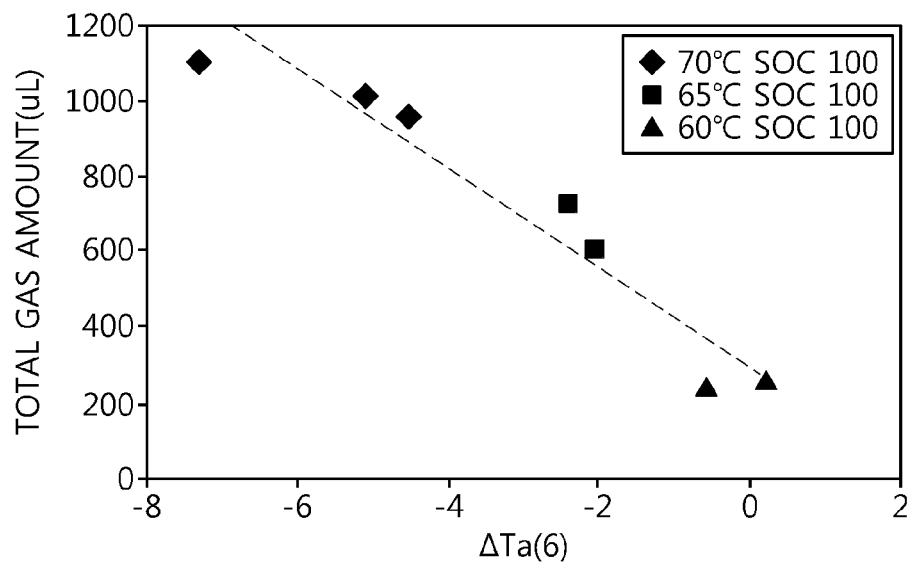
FIG. 2 is a diagram schematically showing a gas amount profile according to an embodiment of the present disclosure.

FIG. 2 is a diagram schematically showing a gas amount profile according to an embodiment of the present disclosure. FIG. 2 shows a gas amount profile expressed as an X-Y two-dimensional graph, in which X is set as the peak change amount and Y is set as the total gas amount. For example, in the embodiment of FIG. 2, the point indicated by ♦ represents the gas amount when the temperature of the battery with SOC 100% is maintained at 70° C. The point indicated by □ represents the gas amount when the temperature of the battery with SOC 100% is maintained at 65° C. The point marked with ▲ represents the gas amount when the temperature of the battery with SOC 100% is maintained at 60° C.

Depending on the embodiment, the gas amount profile may be configured to indicate the correlation between the change amount of the peak determined in the differential profile for the plurality of batteries and the corresponding gas generation amount.

Specifically, the gas amount profile may be configured to indicate the correlation between the gas generation amounts corresponding to the change amount of the peak determined in the differential profile for the plurality of batteries measured at different temperatures. Here, the differential profile may mean a differential voltage profile indicating the correspondence relationship between the capacity (Q) of the battery and the differential voltage (dV/dQ). Here, the capacity (Q) of the battery and the differential voltage (dV/dQ) may be relative values. For example, the capacity (Q) of the battery and the differential voltage (dV/dQ) may be normalized values. This will be explained in detail using FIG. 3.

Figure 3:
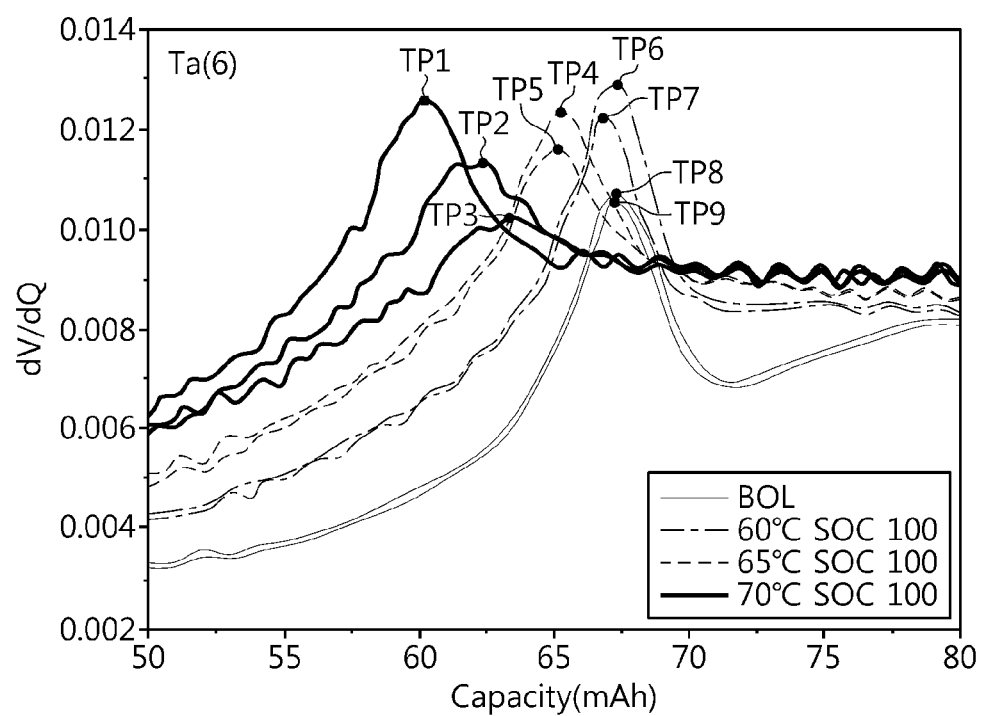
FIG. 3 is a diagram schematically showing a plurality of differential profiles according to an embodiment of the present disclosure.

FIG. 3 is a diagram schematically showing a plurality of differential profiles according to an embodiment of the present disclosure. FIG. 3 shows the plurality of differential profiles expressed as an X-Y two-dimensional graph, in which X is set to the normalized capacity and Y is set to the differential voltage (dV/dQ).

The gas amount profile can be generated based on the change amount of each peak of the plurality of differential profiles. For example, the change amount of the peak may be determined by the result of comparing the peak of the differential profile and the peak of the criterion differential profile. The criterion differential profile may mean a BOL profile.

Referring to FIG. 3, the peak TP1 of the first differential profile is about 17 capacity away to the left from the peak TP8 of the criterion profile, so the change amount of the peak of the first differential profile can be calculated as −17. For example, the control unit 130 can calculate the change amount of the peak of the first differential profile as −17 by subtracting the capacity value of the peak TP1 of the first differential profile from the capacity value of the peak TP8 of the criterion profile.

Conversely, since the peak TP5 of the second differential profile is 5 capacity away to the left from the peak TP8 of the criterion profile, the change amount of the peak of the second differential profile can be calculated as −5.

The gas amount profile may be generated based on the change amount of the peak calculated from each of the plurality of differential profiles and the gas generation amount corresponding to each differential profile.

Referring again to FIG. 2, it can be seen that there is a correlation between the change amount of the peak and the total gas amount. Therefore, according to an embodiment of the present disclosure, using the gas amount profile, the total gas amount can be accurately estimated based on the change amount of the peak.

The profile generating unit 120 can generate a differential profile for the battery profile that represents the correspondence relationship between the capacity of the battery and the differential voltage.

Here, the differential profile may mean a differential voltage profile indicating the correspondence relationship between the capacity (Q) of the battery and the differential voltage (dV/dQ). Here, the capacity (Q) of the battery and the differential voltage (dV/dQ) may be relative values. For example, the capacity (Q) of the battery and the differential voltage (dV/dQ) may be normalized values.

The profile generating unit 120 may directly receive a differential profile from the outside, or may directly generate a differential profile by periodically receiving the voltage and capacity of the battery from the outside.

For example, the battery profile may represent the correspondence relationship between the capacity (Q) of the battery and the voltage (V). Here, the unit of capacity may be [mAh], and the unit of voltage may be [V]. Additionally, the battery profile can be expressed as an X-Y two-dimensional graph in which X is set to capacity and Y is set to voltage.

Additionally, the profile generating unit 120 can generate a differential profile corresponding to the first derivative of the battery profile. For example, the profile generating unit 120 may generate a differential voltage profile indicating a correspondence relationship between the capacity (Q) and the differential voltage (dV/dQ).

Figure 4:
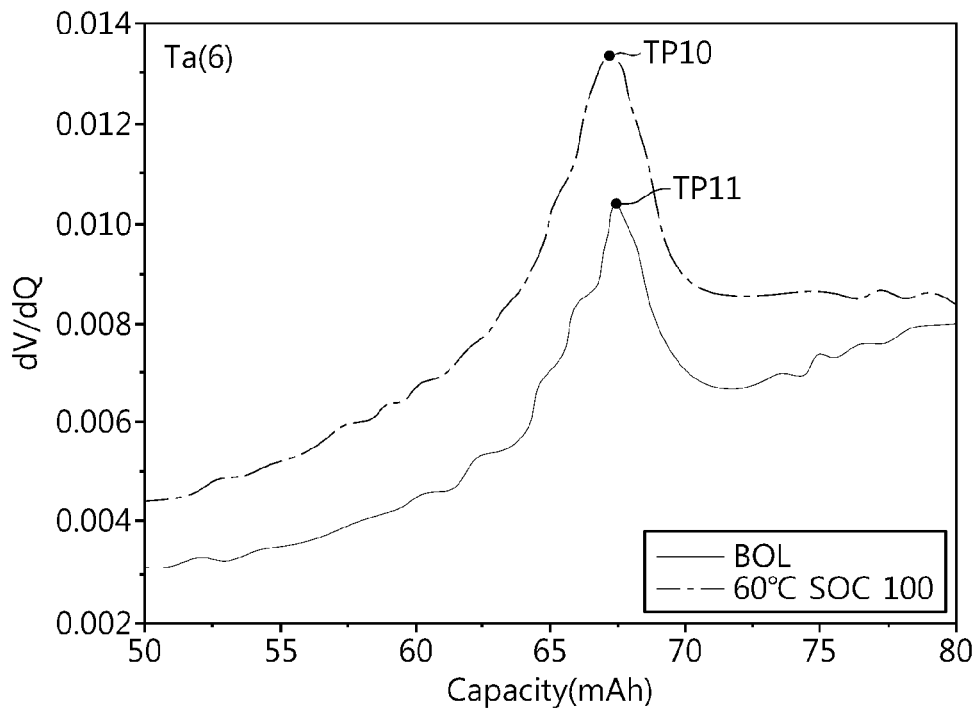
FIG. 4 is a diagram schematically showing a differential profile according to an embodiment of the present disclosure.

FIG. 4 is a diagram schematically showing a differential profile according to an embodiment of the present disclosure.

The control unit 130 can determine the target peak in the differential profile received from the profile generating unit 120. Specifically, the control unit 130 may determine one of the plurality of peaks in the differential profile as the target peak.

Generally, a negative electrode phase transition may occur during the battery charging process. Also, when a negative electrode phase transition occurs, a peak in the differential profile of the battery may appear. For example, when six negative electrode phase transitions occur, Ta(1), Ta(2), Ta(3), Ta(4), Ta(5), and Ta(6) peaks may be sequentially included in the differential profile.

For example, the control unit 130 may determine Ta(6) included in the differential profile as the target peak.

The control unit 130 may determine the change amount of the target peak based on the result of comparing the capacity value of the predetermined criterion peak and the capacity value (TP10) of the target peak.

Referring to FIG. 4, since the capacity value of the target peak (TP10) is about 1 away to the left from the capacity value of the predetermined criterion peak (TP11), the change amount of the target peak can be determined to be −1.

The control unit 130 may set the usage condition of the battery based on a result of comparing the determined change amount of the target peak and a control criterion preset for the gas amount profile. For example, the control unit 130 may adjust the C-rate for the battery based on the result of comparing the change amount of the target peak and the preset control criterion. This will be described later with reference to FIG. 5.

The battery management apparatus 100 according to an embodiment of the present disclosure can accurately diagnose the state of the battery by determining the target peak using a differential profile generated by measuring the battery in real time.

The battery management apparatus 100 according to an embodiment of the present disclosure can prevent degradation of the battery due to gas generation by accurately diagnosing the state of the battery and setting the usage condition of the battery according to the diagnosis result.

Meanwhile, the profile obtaining unit 110, the profile generating unit 120 and the control unit 130 provided in the battery management apparatus 100 may selectively include processors known in the art, application-specific integrated circuits (ASICs), other chipsets, logic circuits, registers, communication modems, data processing devices, and the like to execute various control logic performed in the present disclosure. Also, when the control logic is implemented in software, the profile obtaining unit 110, the profile generating unit 120 and the control unit 130 may be implemented as a set of program modules. At this time, the program module may be stored in a memory and executed by the profile obtaining unit 110, the profile generating unit 120 and the control unit 130. The memory may be located inside or out of the profile obtaining unit 110, the profile generating unit 120 and the control unit 130 and may be connected to the profile obtaining unit 110, the profile generating unit 120 and the control unit 130 by various well-known means.

Here, the battery management apparatus 100 may further include a storage unit 140. The storage unit 140 may store data necessary for operation and function of each component of the battery management apparatus 100, data generated in the process of performing the operation or function, or the like. The storage unit 140 is not particularly limited in its type as long as it is a known information storage means that can record, erase, update and read data. As an example, the information storage means may include RAM, flash memory, ROM, EEPROM, registers, and the like. In addition, the storage unit 140 may store program codes in which processes executable by the control unit 130 are defined.

Hereinafter, the control criterion is explained in detail. The control unit 130 may compare the determined change amount of the target peak and a control criterion preset for the gas amount profile. The control criterion may be a value preset when the battery is created, or a value preset by the user.

Depending on the embodiment, the control criterion may include a first control criterion and a second control criterion. This will be described in detail with reference to FIG. 5.

Figure 5:
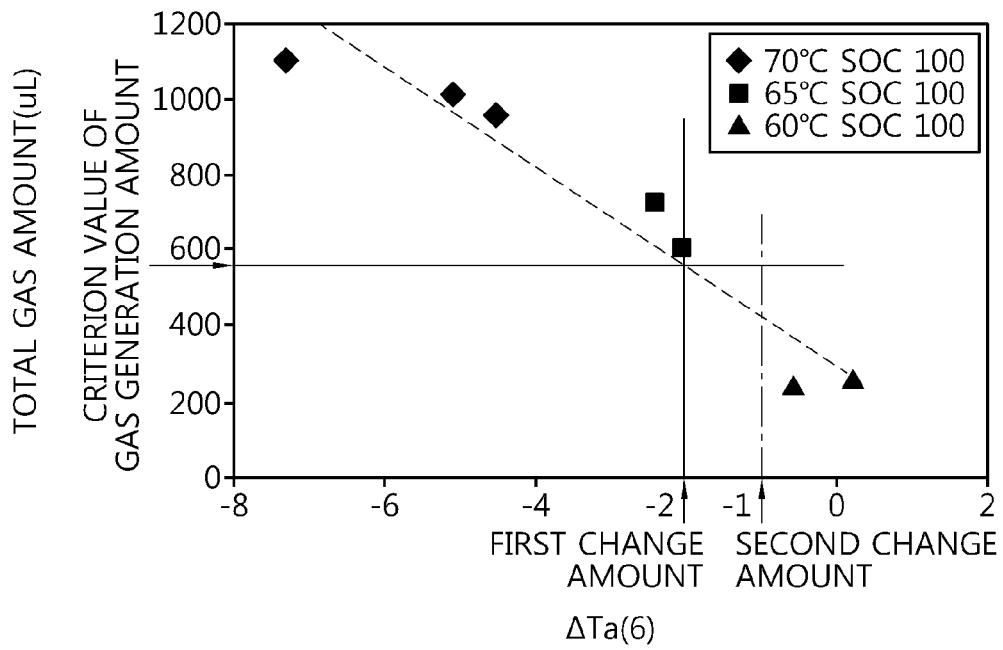
FIG. 5 is a diagram schematically showing a gas amount profile according to an embodiment of the present disclosure.

FIG. 5 is a diagram schematically showing a gas amount profile according to an embodiment of the present disclosure. In FIG. 5, the first change amount and the second change amount are displayed, and it can be seen that the first control criterion is present to the left of the second control criterion.

The control unit 130 can judge whether the change amount of the target peak satisfies the first control criterion. The first control criterion may refer to a criterion for judging whether the change amount of the target peak is less than or equal to the first change amount corresponding to the criterion value of the gas generation amount preset in the gas amount profile. For example, in the embodiment of FIG. 5, the first change amount corresponding to the preset criterion value of the gas generation amount may be −2.

The criterion value of the gas generation amount preset in the gas amount profile may mean a threshold value that requires control of the gas generation amount of the battery. Generally, if the change amount of the target peak of the battery is equal to or less than the first change amount (in other words, if the gas generation amount of the battery is more than the criterion value), it may be the case that the battery has been exposed to high temperature for a relatively long time.

Therefore, when the change amount of the target peak satisfies the first control criterion, the control unit 130 can control the temperature and SOC of the battery and reduce the C-rate. Specifically, the control unit 130 can lower the upper limits of temperature and SOC of the battery. Also, the control unit 130 can reduce the charging C-rate of the battery. For example, in the embodiment of FIG. 5, when the change amount of the target peak of the battery is −2 or less, the control unit 130 may lower the upper limits of the temperature and SOC of the battery and reduce the charging C-rate.

For another example, the control unit 130 can judge whether the change amount of the target peak satisfies the second control criterion. The second control criterion may refer to a criterion for judging whether the change amount of the target peak is less than or equal to the second change amount corresponding to the criterion value of the negative electrode reaction area loss amount. For example, in the embodiment of FIG. 5, the second change amount may be −1.

The criterion value of the negative electrode reaction area loss amount may mean a threshold value that requires control as the negative electrode is degraded and the negative electrode reaction area is lost. In general, loss of negative electrode reaction area has the risk of reducing battery life and accelerating gas generation.

Therefore, the control unit 130 can reduce the C-rate when the change amount of the target peak satisfies the second control criterion. Specifically, the control unit 130 can reduce the charging C-rate of the battery. For example, in the embodiment of FIG. 5, the control unit 130 may reduce the charging C-rate of the battery when the change amount of the target peak of the battery is equal to or less than −1 or more than −2.

Meanwhile, in one embodiment, the first change amount may be less than or equal to the second change amount. As described above, the loss of negative electrode reaction area reduces the lifespan of the battery and thus accelerates gas generation, so the second change amount for the loss of negative electrode reaction area may be greater than the first change amount for the gas generation amount. In other words, because gas may be generated due to loss of negative electrode reaction area, the second change amount may be greater than the first change amount.

In this case, the control unit 130 can set the operating conditions of the battery so that battery abnormalities regarding the loss of negative electrode reaction area and the gas generation amount can be diagnosed step by step. Since the operating conditions of the battery are set step by step, serious degradation of the battery can be prevented and unexpected accidents such as fire or explosion can be prevented in advance.

The battery management apparatus 100 according to the present disclosure may be applied to a BMS (Battery Management System). That is, the BMS according to the present disclosure may include the battery management apparatus 100 described above. In this configuration, at least some of the components of the battery management apparatus 100 may be implemented by supplementing or adding functions of the configuration included in the conventional BMS. For example, the profile obtaining unit 110, the profile generating unit 120, the control unit 130 and the storage unit 140 may be implemented as components of the BMS.

The battery management apparatus 100 according to the present disclosure may be provided in a battery pack 1. That is, the battery pack 1 according to the present disclosure may include the above-described battery management apparatus 100 and one or more batteries. In addition, the battery pack 1 may further include electrical equipment (relays, fuses, etc.) and a case.

Figure 6:
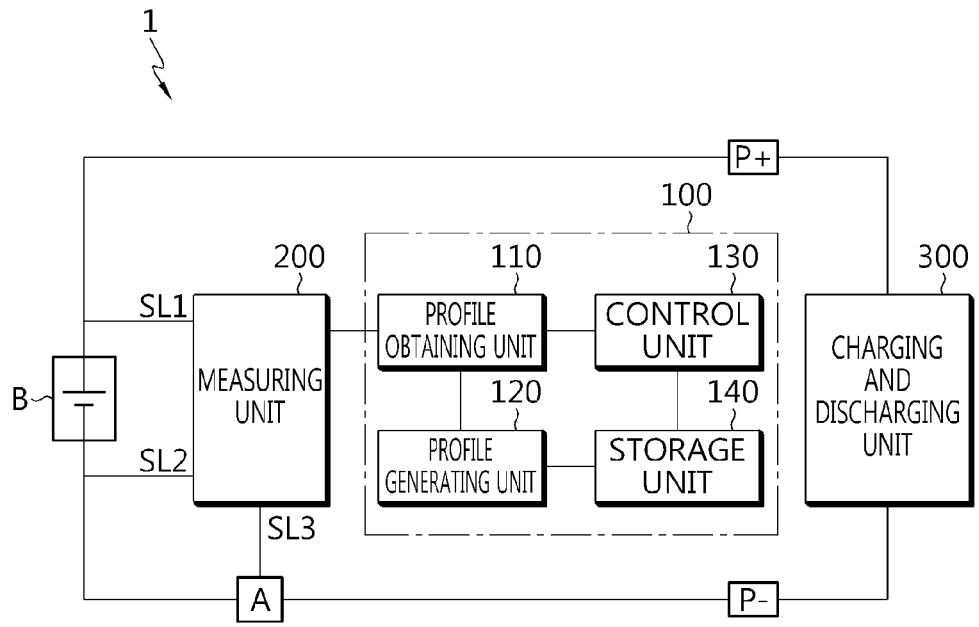
FIG. 6 is a diagram schematically showing an exemplary configuration of a battery pack according to another embodiment of the present disclosure.

FIG. 6 is a diagram schematically showing an exemplary configuration of a battery pack 1 according to another embodiment of the present disclosure.

The positive electrode terminal of the battery B may be connected to the positive electrode terminal P+ of the battery pack 1, and the negative electrode terminal of the battery B may be connected to the negative electrode terminal P− of the battery pack 1.

A measuring unit 200 may be connected to a first sensing line SL1, a second sensing line SL2, and a third sensing line SL3. Specifically, the measuring unit 200 may be connected to a positive electrode terminal of the battery B through the first sensing line SL1, and may be connected to a negative electrode terminal of the battery B through the second sensing line SL2. The measuring unit 200 may measure the voltage of the battery B based on the voltage measured at each of the first sensing line SL1 and the second sensing line SL2.

In addition, the measuring unit 200 may be connected to an ampere meter A through the third sensing line SL3. For example, the ampere meter A may be an ammeter or a shunt resistor capable of measuring the charging current and the discharging current of the battery B. The measuring unit 200 may calculate the charge amount by measuring the charging current of the battery B through the third sensing line SL3. Also, the measuring unit 200 may calculate the discharge amount by measuring the discharge current of the battery B through the third sensing line SL3.

One end of the charging and discharging device may be connected to the positive electrode terminal P+ of the battery pack 1, and the other end may be connected to the negative electrode terminal P− of the battery pack 1. Therefore, the positive electrode terminal of the battery B, the positive electrode terminal P+ of the battery pack 1, the charging and discharging unit 300, the negative electrode terminal P− of the battery pack 1, and the negative electrode terminal of the battery B may be electrically connected.

Figure 7:
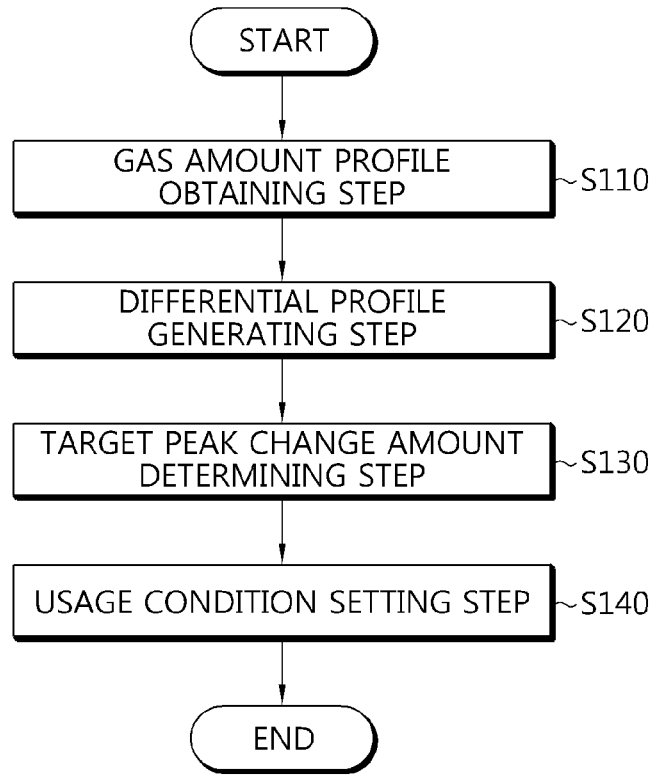
FIG. 7 is a diagram schematically showing a battery management method according to still another embodiment of the present disclosure.

FIG. 7 is a diagram schematically showing a battery management method according to still another embodiment of the present disclosure.

Preferably, each step of the battery management method may be performed by the battery management apparatus 100. Hereinafter, contents overlapping with the previously described contents will be omitted or briefly described.

The gas amount profile obtaining step (S110) is a step of obtaining a gas amount profile indicating the correspondence relationship between the gas generation amount of the battery and the change amount of the peak, and may be performed by the profile obtaining unit 110.

For example, the profile obtaining unit 110 may directly receive the gas amount profile from the outside. The gas amount profile may mean a profile that is created based on the differential profile for a plurality of batteries with different temperatures in a specific SOC and the gas generation amount of the plurality of batteries.

Depending on the embodiment, the gas amount profile may be configured to indicate the correlation between the change amount of the peak determined in the differential profile for the plurality of batteries and the corresponding gas generation amount.

Specifically, the gas amount profile may be configured to indicate the correlation between the gas generation amounts corresponding to the change amount of the peak determined in the differential profile for the plurality of batteries measured at different temperatures.

The differential profile generating step (S120) is a step of generating a differential profile for the battery profile indicating the correspondence relationship between the capacity of the battery and the differential voltage, and may be performed by the profile generating unit 120.

For example, the profile generating unit 120 may generate a differential profile for the battery profile indicating the correspondence relationship between the capacity of the battery and the differential voltage.

Here, the differential profile may mean a differential voltage profile indicating the correspondence relationship between the capacity (Q) of the battery and the differential voltage (dV/dQ). Here, the capacity (Q) of the battery and the differential voltage (dV/dQ) may be relative values. For example, the capacity (Q) of the battery and the differential voltage (dV/dQ) may be normalized values.

The target peak change amount determining step (S130) is a step of determining a change amount of a target peak in the differential profile generated in the profile generating step (S120), and may be performed by the control unit 130.

For example, the control unit 130 may determine the target peak in the differential profile received from the profile generating unit 120. Specifically, the control unit 130 may determine one of the peaks in the differential profile as the target peak. For example, the control unit 130 may determine Ta(6) included in the differential profile as the target peak.

The control unit 130 may determine the change amount of the target peak based on the result of comparing the capacity value of the predetermined criterion peak and the capacity value of the target peak.

The usage condition setting step (S140) is a step of setting the usage condition of the battery based on the result of comparing the determined change amount of the target peak with a control criterion preset for the gas amount profile, and may be performed by the control unit 130.

For example, the C-rate of the battery can be adjusted according to the comparison result of the change amount of the target peak and a control criterion preset for the gas amount profile.

The control criterion may be a value preset when the battery is created, or a value preset by the user. Depending on the embodiment, the control criterion may include a first control criterion and a second control criterion.

For example, the control unit 130 can judge whether the change amount of the target peak satisfies the first control criterion. The first control criterion may refer to a criterion for judging whether the change amount of the target peak is less than or equal to the first change amount corresponding to the criterion value of the gas generation amount preset in the gas amount profile. If the change amount of the target peak satisfies the first control criterion, the control unit 130 can adjust the temperature and SOC of the battery and reduce the C-rate.

For another example, the control unit 130 can judge whether the change amount of the target peak satisfies the second control criterion. The second control criterion may refer to a criterion for judging whether the change amount of the target peak is less than or equal to the second change amount corresponding to the criterion value of the negative electrode reaction area loss amount. The control unit 130 can reduce the C-rate if the change amount of the target peak satisfies the second control criterion.

The control unit 130 can set the operating conditions of the battery so that battery abnormalities regarding the loss of negative electrode reaction area and the gas generation amount can be diagnosed step by step. Since the operating conditions of the battery are set step by step, serious degradation of the battery can be prevented and unexpected accidents such as fire or explosion can be prevented in advance.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

EXPLANATION OF REFERENCE SIGNS

1: battery pack
100: battery management apparatus
110: profile obtaining unit
120: profile generating unit
130: control unit
140: storage unit
200: measuring unit
300: charging and discharging unit

What is claimed is:

1. A battery management apparatus, comprising:
one or more processors; and
one or more memories storing program code that, when executed on the one or more processors, cause the one or more processors to perform:
obtaining a gas amount profile indicating a correspondence relationship between a gas generation amount of a battery and a change amount of a peak;
generating a differential profile for a battery profile indicating a correspondence relationship between a capacity of the battery and a differential voltage;
determining a change amount of a target peak in the battery profile; and
setting a usage condition of the battery based on a first result determined by comparing the change amount of the target peak with a control criterion of the gas amount profile,
wherein the control criterion includes:
a first control criterion configured to determine whether the change amount of the target peak is less than or equal to a first change amount corresponding to a criterion value of the gas generation amount preset in the gas amount profile; and
a second control criterion configured to determine whether the change amount of the target peak is less than or equal to a second change amount corresponding to a criterion value based on a loss amount of a negative electrode reaction area, and
wherein setting the usage condition of the battery comprises:
adjusting a temperature and a state of charge (SOC) of the battery and reducing a C-rate when the change amount of the target peak satisfies the first control criterion.

2. The battery management apparatus according to claim 1, wherein the program code, when executed on the one or more processors, cause the processor to perform:
determining the target peak in the differential profile and determining the change amount of the target peak based on a second result determined by comparing a capacity value of a preset criterion peak and a capacity value of the target peak.

3. A battery management apparatus, comprising:
one or more processors; and
one or more memories storing program code that, when executed on the one or more processors, cause the one or more processors to perform:
obtaining a gas amount profile indicating a correspondence relationship between a gas generation amount of a battery and a change amount of a peak;
generating a differential profile for a battery profile indicating a correspondence relationship between a capacity of the battery and a differential voltage;
determining a change amount of a target peak in the battery profile; and
setting a usage condition of the battery based on a first result determined by comparing the change amount of the target peak with a control criterion of the gas amount profile,
wherein the control criterion includes:
a first control criterion configured to determine whether the change amount of the target peak is less than or equal to a first change amount corresponding to a criterion value of the gas generation amount preset in the gas amount profile; and a second control criterion configured to determine whether the change amount of the target peak is less than or equal to a second change amount corresponding to a criterion value based on a loss amount of a negative electrode reaction area, and wherein setting the usage condition of the battery comprises:

reducing a C-rate when the change amount of the target peak satisfies the second control criterion.

4. The battery management apparatus according to claim 1, wherein the first change amount is less than or equal to the second change amount.

5. The battery management apparatus according to claim 1, wherein the gas amount profile is generated based on a first differential profile for a plurality of batteries with different temperatures in an SOC and a first gas generation amount of the plurality of batteries.

6. The battery management apparatus according to claim 5, wherein the gas amount profile comprises correlation information between a change amount of a peak determined in a second differential profile for the plurality of batteries and a second gas generation amount.

7. A battery pack, comprising the battery management apparatus according to claim 1.

8. A battery management method implemented via execution of program code configured to run at one or more processors, the method comprising:

obtaining a gas amount profile indicating a correspondence relationship between a gas generation amount of a battery and a change amount of a peak;

generating a differential profile for a battery profile indicating a correspondence relationship between a capacity of the battery and a differential voltage;

determining a change amount of a target peak in the battery profile; and setting a usage condition of the battery based on a first result determined by comparing the change amount of the target peak with a control criterion of the gas amount profile, wherein the control criterion includes:

a first control criterion configured to determine whether the change amount of the target peak is less than or equal to a first change amount corresponding to a criterion value of the gas generation amount preset in the gas amount profile; and a second control criterion configured to determine whether the change amount of the target peak is less than or equal to a second change amount corresponding to a criterion value based on a loss amount of a negative electrode reaction area, and wherein setting the usage condition of the battery comprises:

adjusting a temperature and a state of charge (SOC) of the battery and reducing a C-rate when the change amount of the target peak satisfies the first control criterion.

* * * * *